United States Patent
Toutonghi et al.

[11] Patent Number: 5,920,720
[45] Date of Patent: Jul. 6, 1999

[54] EFFICIENT COMPUTER BASED VIRTUAL MACHINE OBJECT STRUCTURE

[75] Inventors: Michael J. Toutonghi, Seattle; Peter Kukol, Monroe; Patrick Dussud, Bellevlle, all of Wash.

[73] Assignee: Microsoft Corporation, Redmond, Wash.

[21] Appl. No.: 08/803,958

[22] Filed: Feb. 25, 1997

[51] Int. Cl.$^6$ ...................................................... G06F 9/06
[52] U.S. Cl. ............................................................ 395/705
[58] Field of Search .................................... 395/705, 703, 395/702, 712, 683

[56] References Cited

U.S. PATENT DOCUMENTS

| | | | |
|---|---|---|---|
| 5,297,284 | 3/1994 | Jones et al. ................................ | 395/705 |
| 5,327,562 | 7/1994 | Adcock ...................................... | 395/708 |
| 5,361,350 | 11/1994 | Conner et al. . | |
| 5,404,525 | 4/1995 | Endicott et al. .......................... | 395/702 |
| 5,410,705 | 4/1995 | Jones et al. ................................ | 395/705 |
| 5,644,771 | 7/1997 | Endicott et al. .......................... | 395/712 |
| 5,740,441 | 4/1998 | Yellin et al. .............................. | 395/704 |

OTHER PUBLICATIONS

Arnold, K., et al., *The Java™ Programming Language*, Addison–Wesley Publishing Company, Inc., pp. i–xiii (1996).

Lindholm, T., et al., *The Java™ Virtual Machine Specification*, Addison–Wesley, pp. i–xi, 1–82 (1997).

*Primary Examiner*—Thomas R. Peeso
*Assistant Examiner*—Matthew Smithers
*Attorney, Agent, or Firm*—Watts, Hoffmann, Fisher & Heinke Co., L.P.A.

[57] ABSTRACT

Method and apparatus for implementing a virtual machine interpreter such as an interpreter for interpreting Java compiled bytecodes. The Java language supports class structures and a hierarchy of such structures. As the Java software virtual machine loads the class file containing the Java bytecodes it allocates a first block, of memory based on the class definition for all dynamic methods implemented by a class hierarchy that includes a base class and any additional classes derived from the base class. The virtual machine instantiates instances of classes within a class hierarchy derived from the base class in other memory blocks by initializing a method table pointer at a base location in that other memory block for each such instance in the class hierarchy. The method table pointer is initialized to point to the first block of memory defining the dynamic methods for the class hierarchy. The interpreter also initializes other data unique to each instance at offsets relative to the method table pointer within the other memory block for said class instance. Practice of the invention enhances the speed with which the virtual machine accesses dynamic methods of objects within the class hierarchy.

18 Claims, 3 Drawing Sheets

EFFICIENT COMPUTER BASED VIRTUAL MACHINE OBJECT STRUCTURE

FIELD OF THE INVENTION

The present invention concerns an object structure for use with a software virtual machine such as a program that converts a compiled file of bytecodes into machine code for execution on a computer. The software virtual machine can operate as either an interpreter that examines the byte codes serially or as a program that produces an executable file by compiling the bytecodes.

BACKGROUND ART

The Java programming language is an object oriented programming language that has been used by many in the computer industry, especially in applications written for use on the Internet. One perceived advantage with the Java language is the fact that the source language is implementation independent and therefore a source code Java program can run without change on a number of different hardware implementations so long as the hardware has an interpreter that correctly interprets the compiled Java program.

The fact that Java supports classes and objects is a second reason it has been well accepted. The C++ programming language was developed as an extension to the C programming language to support object oriented concepts such as inheritance and polymorphism. The Java language is similar in many ways to C++ and therefore it has been relatively easy for experienced C++ programers to write programs in Java.

Objects conform to a structure that is defined in that object's class definition. In both C++ and Java, so called class definitions define an organization scheme for methods and data for specific instances or objects of the class. See Barjne Stroustrup, The C++ Programming Language (1986) and Ken Arnold and James Gosling, The Java Programming Language (1996). The class definition not only defines what data an object has but how that data is manipulated and by what portions of the program.

Classes can inherit members from parent classes that include constants (static final fields), static fields and static methods which exist once for all instances of a class in one name space and are shared between multiple class instances. Classes can also inherit dynamic fields which exist separately for every instance of the class type and they can inherit dynamic methods which operate on specific instances of a class through a "this" pointer.

The Java programming language also supports a programming construct called an interface. The interface is similar to a class declaration in C++. The interface has declarations of abstract dynamic methods, constants, and properties which can be thought of as virtual fields. The interfaces are implemented by specific class instances. When a class implements an interface, it must contain an implementation or definition of each dynamic method declared in the interface. The class must also implement each dynamic method for other interfaces which the interface extends.

Source code written in the Java programming language is compiled by a Java compiler into a binary file referred to as a class file that contains bytecodes of data. The bytecodes have an eight bit op-codes and one or more eight or sixteen bit operands for the op-code. These bytecodes are sequentially interpreted by a software virtual machine that interprets the bytecodes and converts them to executable machine language code on the computer hardware that executes the software virtual machine. The software virtual machine interprets the compiled bytecodes in a way somewhat similar to the way a central processing unit interprets machine code instructions.

The software virtual machine must correctly interpret the compiled bytecodes in the class file in a way that is consistent with the language definition. Other than this constraint, the designer of the software virtual machine software is free to write the software in ways that enhance performance. The Java virtual machine specification is publically availiable both via the Internet and in a published text. Tim Lindholm and Frank Yellin, The Java Virtual Machine Specification (1997). One prior art software virtual machine has been implemented by Sun Microsystems Inc. of Mountain View, Calif. and has been widely distributed for use with the Java programming language.

During startup of Sun's software virtual machine certain data structures are created after the class file is loaded. In a linking step, a binary form of a class or interface type is combined into the runtime state of the software virtual machine. After the virtual machine verifies that the compiled Java code is structurally correct, the virtual Machine is prepared for execution. This preparation phase or step can include the step of precomputing data structures in the memory of the target machine to make the processing of sequentially interpreting the bytecodes of the binary representation more efficient. One useful data structure is a "method table that allows methods to be invoked on instances of a class without resort to a search of superclasses at the time the class instance is invoked." Lindholm et al, supra, at page 45.

Figure 3:
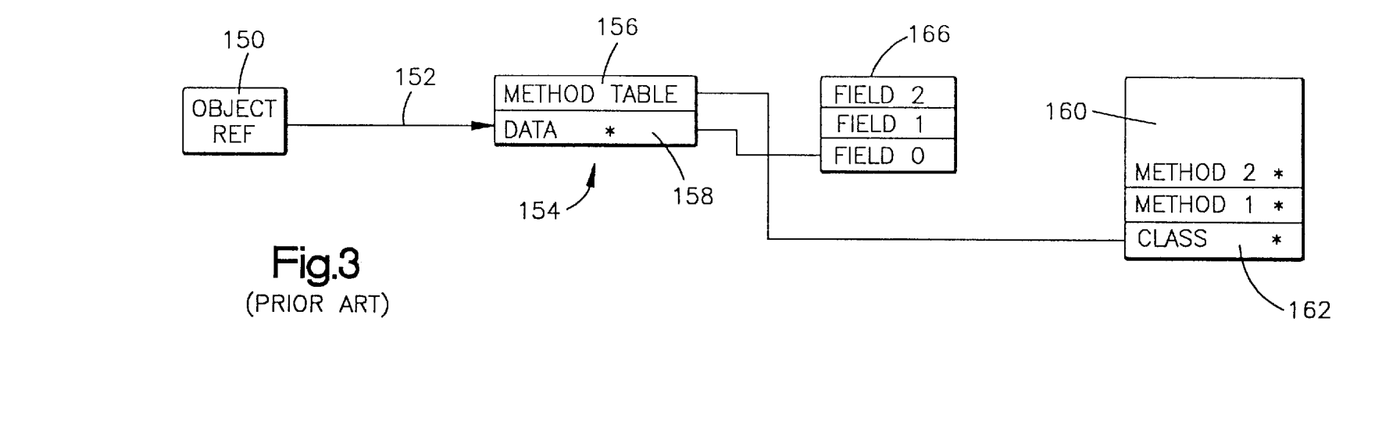
FIG. 3 is a schematic depiction of a prior art data structure for use in resolving object references during execution of an interpreter.

During interpretation by the virtual machine, whenever a new class instance or object is created, memory of a sufficient quantity is allocated for that class instance with room for all the fields of that class instance and the fields of any superclasses from which the new class instance depends. In the present Sun implementation of its virtual machine, a reference to a class instance or object is a pointer to a handle that is itself a pair of pointers: one pointer points to the address of a table containing the methods of the object and a pointer to the class object that represents the type of the object and the second points to the memory allocated from the Java heap for the object data. Lindholm et al, supra, at page 69. This pointer relationship is represented in FIG. 3 which has been labeled as prior art.

U.S. Pat. No. 5,361,350 to Conner et al describes an object oriented method management system. The '350 patent describes a system for managing class method names by collecting a representation of the names and additional supporting information in a single data structure.

The present invention concerns an improved implementation of a virtual machine system such as the Java virtual machine. An object model of the invention facilitates decomposition of objects into their member components more efficiently than existing prior art virtual machines.

SUMMARY OF THE INVENTION

The present invention relates to a new method and apparatus for implementing a software virtual machine in an object oriented programming application. More particularly, the invention relates to a virtual machine implementation that provides fast access to an objects components. One application of the invention is in implementing a Java language virtual machine interpreter.

A preferred embodiment of the present invention includes an improved method for accessing objects in a class hierarchy. The method includes the steps of allocating a first block of memory based on the class definition for all dynamic methods implemented by a class. This hierarchy include a base class and any additional classes derived from the base class.

As object instances are encountered in the code, the software virtual machine allocates an additional memory block for the specific object instance and initializes a method table pointer at a base location of the additional memory block for that object instance. The method table pointer points to the first block of memory defining the dynamic methods for that object's class. The software virtual machine also initializes other data unique to each instance at offsets relative to the method table pointer within the other memory block for the class instance.

Practice of the invention allows the software virtual machine to quickly access both an object's dynamic methods and its data. Object data is located at a memory location offset from the method table pointer. Object methods are quickly found regardless of whether the method is a class method or an interface method that the object's class implements. Unlike the prior art Java virtual machine discussed above, the disclosed access method avoids double indirection using two pointers to access an object's data.

These and other objects, advantages and features of the invention will become better understood from the detailed description of a preferred embodiment of the present invention which is described in conjunction with the accompanying drawings.

BEST MODE FOR PRACTICING THE INVENTION

Figure 1:
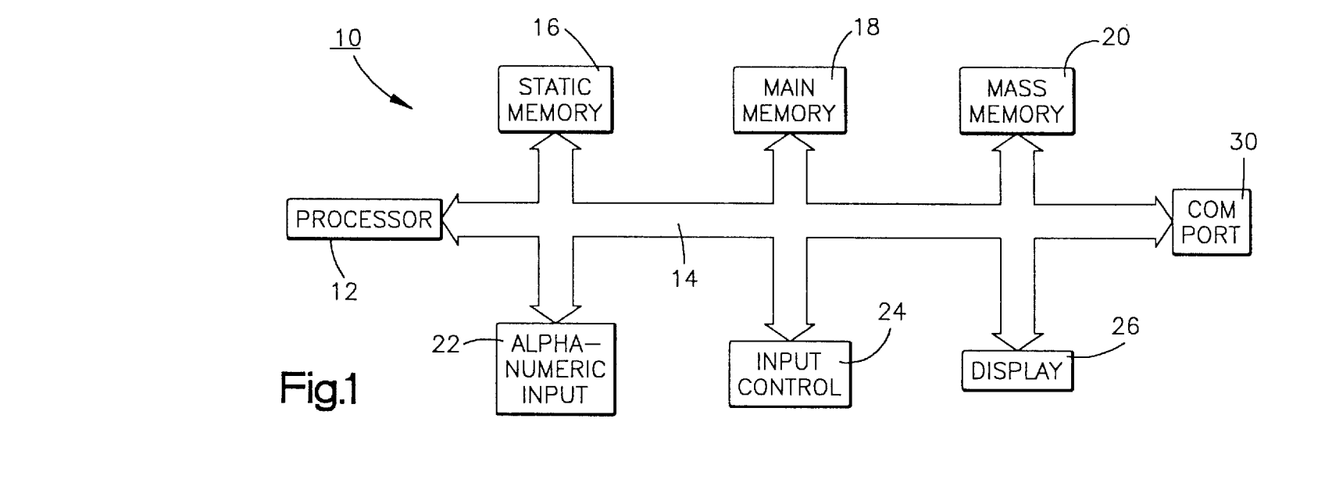
FIG. 1 is a schematic representation of a computer system for implementing a virtual machine code interpreter constructed in accordance with the present invention.

FIG. 1 illustrates the operating environment of a software virtual machine (VM) for executing an instruction set that has been compiled from a source code program such as a program written in the Java programming language. The virtual machine does not target a specific programming language but instead executes statements from a set of virtual machine statements, commonly referred to as bytecodes. The virtual machine converts those statements into machine code on a data processing system 10.

Data Processing System 10

As illustrated in FIG. 1, the data processing system 10 includes a processor 12, a system bus 14, a static memory 16, a main memory 18, a mass memory 20, an alphanumeric input device 22, an control device 24 for manipulating a cursor, and a display 26. The processor 12 comprises a suitable processing device such as a microprocessor, for example, and may comprise a plurality of suitable processing devices. The processor 12 executes instructions stored in the static memory 16, main memory 18, and/or mass memory 20.

The static memory 16 may comprise read only memory (ROM) or any other suitable memory device. The static memory 16 may store, for example, a boot program for execution by the processor 12 to initialize the data processing system 10. The main memory 18 may comprise random access memory (RAM) or any other suitable memory device. The mass memory 20 may include a hard disk device, a floppy disk, an optical disk, a flash memory device, a file server device, or any other suitable memory device. For this detailed description, the term memory comprises a single memory device and any combination of suitable memory devices for the storage of data and instructions.

The system bus 14 provides for the communication of digital information between the hardware devices of the data processing system 10. The processor 12 also receives data over the system bus 14 that is input by a user through the alphanumeric input device 22 and/or the cursor control device 24. The alphanumeric input device 22 may comprise a keyboard, for example, that comprises alphanumeric keys. The alphanumeric input device 22 may comprise other suitable keys, comprising function keys for example. The cursor control device 24 may comprise a mouse, touch tablet, track-ball, and/or joystick, for example, for controlling the movement of a cursor displayed on the display 26.

The FIG. 1 data processing system 10 also includes a communications port 30 that may be implemented as a circuit that interfaces with the bus 14 for communicating with the processor 12. The communications port 30 can include a modem or other device for allowing data to be transmitted to the system 10 by means of communications lines that in part define the Internet. Communications with the Internet facilitates receipt by the system 10 of compiled bytecode data derived from Java programming language source code that has been converted into bytecodes at a remote location.

The processor 12 outputs data via the system bus 14 that is to be displayed on display 26. Display 26 may comprise a cathode ray tube (CRT) or a liquid crystal display (LCD), for example, for displaying information to a user.

The data processing system 10 stores an executable file for implementing a software virtual machine (VM). For one embodiment, the executable program code or machine instructions may be stored in main memory 18 and/or in mass memory 20, such as on a suitable magnetic or optical disk. The program analyzed by the software virtual machine may also be stored in main memory 18 and/or in mass memory 20, but also may be obtained via the communications port 30 from other sources remote from the data processing system 10.

Software Virtual Machine 100

Figure 2:
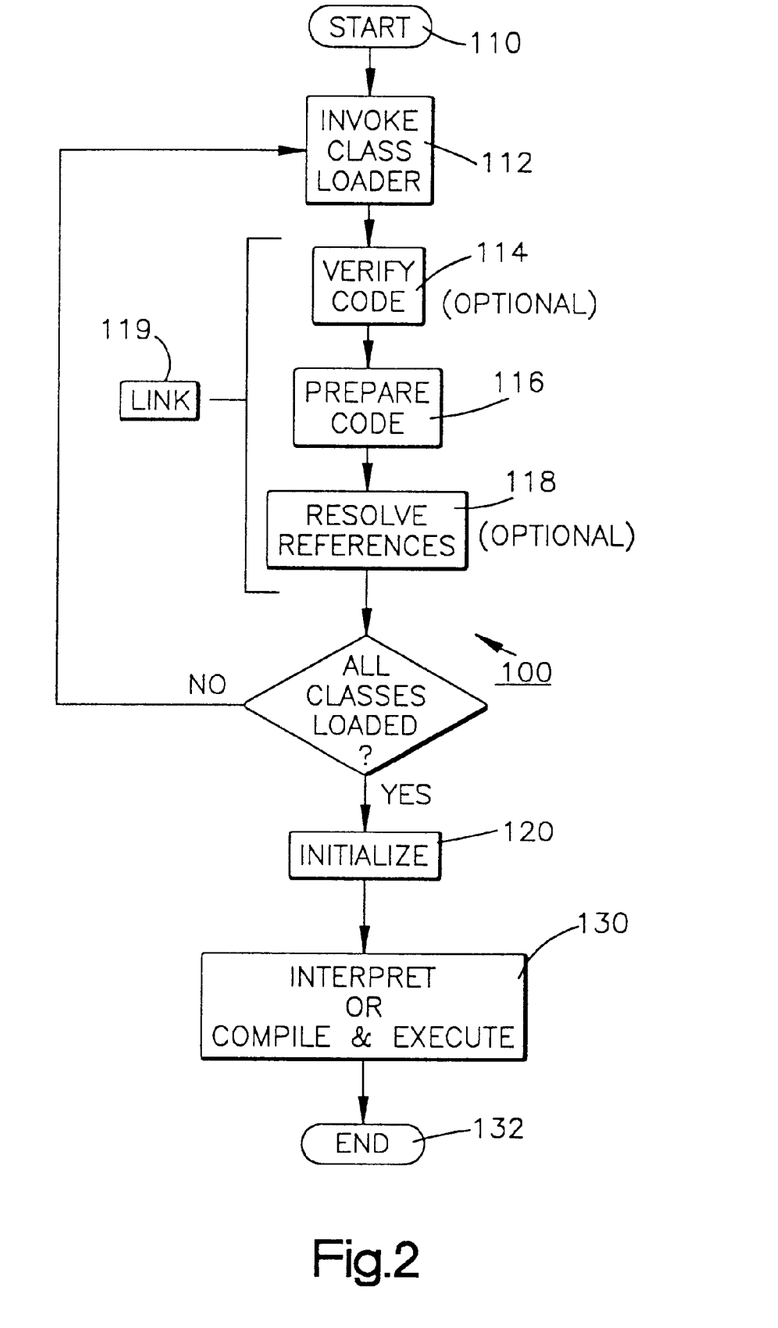
FIG. 2 is a flow chart of the steps performed by a software virtual machine constructed in accordance with the present invention.

Referring now to FIG. 2, one implementation of a software virtual machine 100 constructed in accordance with the present invention is written in C++ with certain time critical portions of the virtual machine written in assembly code that is linked with C++ written object modules. The virtual machine receives as input a previously compiled program that forms a sequence of bytecode instructions and will hereinafter be referred to as compiled code. In the discussion that follows, it is presumed that the compiled code is based on the Java source code, but the compiler could also produce compiled code from other languages for input to the software virtual machine 100.

A Java class includes declarations of data and method members. Classes can inherit from parent classes and may include constants (static final fields), static fields and methods which exist once for all instances of a class and are shared between instances of that class. Dynamic fields exist separately in every instance of the class type, and dynamic methods operate on specific instances of a class through a "this" pointer.

Java interfaces declare only abstract, dynamic methods, constant fields, and properties (which can be thought of as "virtual fields"). Methods declared in an interface can only be implemented in a class, not in an interface. When a class implements an interface, it must implement every method in that interface, and all other interfaces which the interface extends. If the class does not fulfill these requirements, the Java compiler will not create the class file but will instead output an appropriate error message.

The software virtual machine 100 is invoked by system software running on the data processing system 10. A command prompt, for example, that appears on the display 26 allows a user to start the software virtual machine 100 with a simple command, i.e. 'java_vm' with a particular file as a parameter appended to this command. The appended file name is the source of the compiled code that contains a sequence of bytecodes to be interpreted by the software virtual machine 100. Such a file is referred to as a class file. The class file can also be interpreted by a Java enabled Internet Web browser such as Internet Explorer distributed by the assignee of the present invention. This web browser utilizes a software virtual machine in accordance with the invention.

FIG. 2 is a flow chart listing the steps in starting and executing the instructions in the class file by the software virtual machine 100 running on the data processing system 10. The FIG. 2 process begins at a step 110. This step can be entry of an appropriate command by the user at a system prompt or can alternately be the receipt of a class file by an already loaded and running Web browser. This step 110 could also correspond to a command that causes the system 10 to both compile a Java source code file of the program stored on disk, for example, and interpret that program after compilation.

To execute the bytecodes the virtual machine software causes a class loader to load 112 the class file. This step 112 causes the class loader software to bring a binary file of the compiled program into computer memory. A next sequence of steps 114, 116, 118 are together referred to as a linking procedure 119. During a first optional step 114 of the linking procedure, the software virtual machine 100 verifies the form of the bytecodes that make up the class file. Part of the verification step 114 checks the form of the compiled bytecodes of the fields, the methods and the interfaces contained within the class file. See Lindholm et al, supra, chapter 2.

A next step 116 of the linking procedure is a preparation step. This step can include the preparation of data structures that make execution of the compiled code more efficient. As an example, when the binary representation of a class file is loaded, class methods are stored in memory and the preparation phase can involve setting up efficient mechanisms for accessing those methods when the code requires such access rather than taking the time to calculate the address each time the virtual machine encounters an object of a certain class type.

A next step 118 is also optionally part of the linking process. This step 118 involves resolution of references to symbolic references within a class structure. This step also speeds execution of compiled code by the virtual machine once program interpretation begins. If resolution is not performed as the program is prepared for execution during linking, it must occur "on the fly" as the compiled code is interpreted.

During the linking process other classes are typically referenced in the class being linked. These references to other classes may be superclasses of the class that is being linked as well as class instances of other class hierarchies. Each instance of another class invokes the class loader in a recursive fashion until all classes that are necessary for execution have been loaded and linked by the software that implements the software virtual machine 100.

Once all classes have been loaded, the software virtual machine 100 performs an initialization step 120 where class constructor methods are executed as needed. These constructor methods typically initialize data fields of objects. The software virtual machine 100 next sequentially either interprets or compiles and executes 130 bytecodes of the compiled code until all threads of the compiled code have ended. This concludes the process and the virtual machine stops 132 and returns the system 10 back to the operating system software or browser that started execution of the virtual machine 100.

Prior art data structure for object references

FIG. 3 depicts an object member access structure of Sun Microsystem's prior art virtual machine. During the resolution step 118 (FIG. 2), the Sun virtual machine creates references to objects. Such a reference to a class instance or object 150 is a pointer 152 to a handle 154 (FIG. 3). This handle 154 is itself a pair of pointers 156, 158. One pointer 156 points to a table 160 containing the methods of the object 150 and also contains a pointer 162 (Class*) to a class object that defines the type of the object. The class structure is a data structure set up by the virtual machine based upon the data from the constant pool of the class file that is loaded into memory by the class loader and defines the type of the class. The second pointer 164 contained within the handle 154 points to memory allocated from the heap for data 166 (fields) of the object 150. In order to access the data in FIELD0 the software virtual machine must first obtain the pointer 152 and then look up the data pointer 158 before retrieving the data in FIELD0. This step of double indirection is avoided during data accesses performed by the disclosed software virtual machine.

Object structure of the invention

Figure 4A:
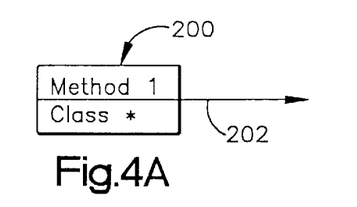
FIGS. 4A–4C are data structures used by a virtual machine constructed in accordance with an exaplary embodiment of the present invention for speeding access to object data and methods.
Figure 4B:
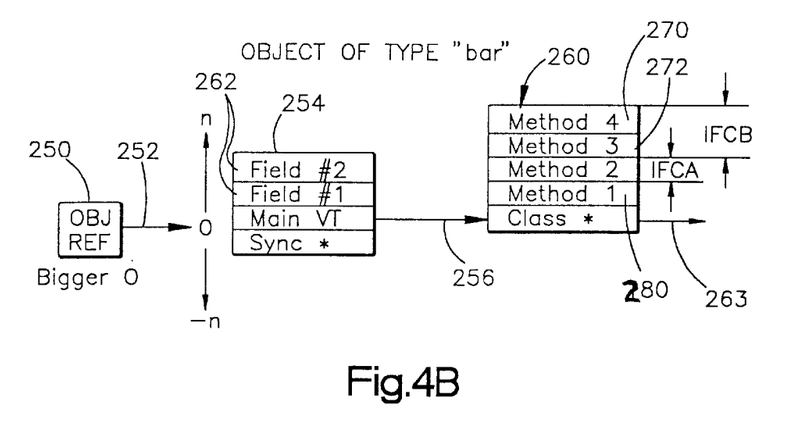
Figure 4C:
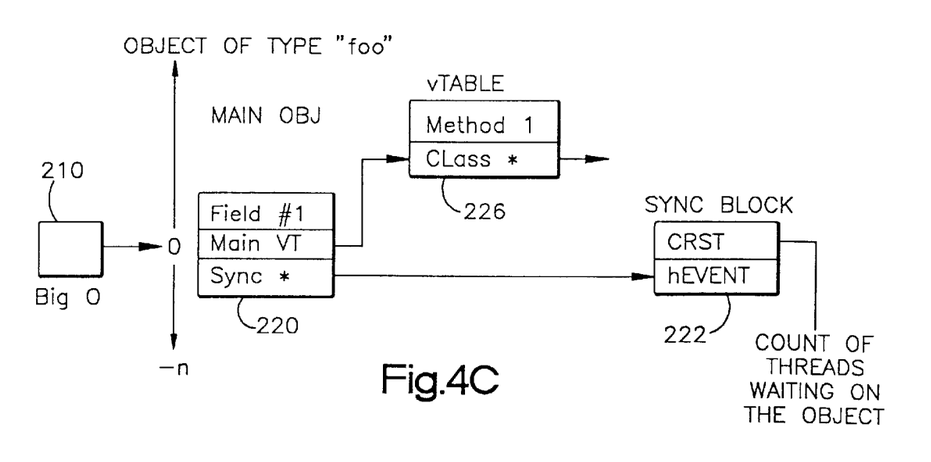

FIGS. 4A–4C illustrate the organization of object structures implemented by a virtual machine constructed in accordance with the present invention. As seen in FIG. 4B, a reference to an object 250 is also a pointer 252. This pointer 252 points to an object instance 254 that is a data structure having a base memory location (offset location 0) that contains a pointer 256 to a first block of memory containing a data structure (referred to as a vtable 260) that allows rapid access to dynamic methods implemented by a class hierarchy that includes a class for the object 250 and any additional superclasses that form the class hierarchy for the object 250.

An object instance 254 such as the data structure of FIG. 4B is created for every class instance. Creation of the object table and linking by means of the pointer 256 to the vtable 260 that contains dynamic methods allows the methods to be quickly accessed. Access to methods for all objects within a class hierarchy are through similar vtables for object instances of each class. Each instance of an object within a different class of the same class hierarchy including the object 250 points to a different vtable data structure that contains a pointer to the other object's class structure and also contains the dynamic methods defined by that class, inherited methods of other classes in the class hierarchy, and interface methods implemented by that class. The object instance 254 must also accommodate other data that is unique to the object 250. This other data 262 is located within the object instance 254 at offsets relative to the method table pointer 256.

The vtable 260 is built in stages. When a base interface is loaded from a class file, vtables for the interface (that eventually combine to form the vtable 260) are created in memory for the interface methods, fields and any interfaces which the interface extends. The field tables are arrays of intermediate field descriptor structures that include the type of data for each field. The class methods also are described by arrays of intermediate method descriptor structures. Each field has data at an appropriate offset relative to the method table pointer and each method has a vtable entry associated with the method which can be accessed by an index into the vtable 260 which remains constant throughout the hierarchy of a class. The intermediate data structures for the fields and methods are used in creating the vtable 260 and the object instance 254.

The arrangement of the various tables and fields is now described with a specific example that includes Java source code.

```
public class foo {
public int Field1;
        void Method1() {}
}
```

For this example, it is instructive to focus on one field, i.e. Field1 and one method, Method1. The class vtable (to be distinguished from the object table) is depicted in FIG. 4A. This vtable 200 includes a pointer 202 to the class structure that is derived from the constant pool portion of the class file. The VM sets up the class data structure pointed to by the pointer 202 to include data identifying interfaces implemented by the class as well as interfaces that each interface of the class extends. These interface ID's are paired with offsets into the vtables for the class identifying where the interface methods can be found. Note, space for the vtable 200 is allocated by the software virtual machine 100 when the foo class is loaded and the preparation step 116 (FIG. 2) is performed.

Referring now to FIG. 4C, when an object 210 of type foo is created, object "BigO" for example, the software virtual machine 100 creates the object table 220. This occurs when the software virtual machine 100 resolves a statement such as "foo BigO=new foo( );". This table 220 contains space for Field1, a main vtable pointer, and a pointer to a synchronization block. Note that the synchronization pointer field for an object contains a 'dummy' address if the synchronization block is not used. It is created 'lazily' in order to conserve space in non-synchronized objects. The object table 226 exists only once per class and is shared among objects of that class type. The synchronization block 222, however, is created for each instance of the object.

The object instance 254, and the vtable 260 are associated with an object "BiggerO" of class 'bar'. The class 'bar'. is derived from class 'foo' and implements two interfaces IFCA and IFCB where IFCA implements one interface method, Method2 and IFCB implements two additional methods, Method3 and Method4. At the time of resolution, the class structure pointed to by the pointer 263 contains the interface identifiers which identify offsets of the different methods implemented by those interfaces. A given method is identified by its interface identifier or ID and the offset of the method within the interface.

An interface portion of the vtable 260,'Method' in FIG. 4B, for example, is a pointer to method code. During the resolution step 118, when the software virtual machine 100 encounters an object such as "BiggerO" having a class type 'bar' that implements an interface, a pointer to the interface code is placed in the vtable 260. As seen in FIG. 4B, the vtable 260 contains pointers 270, 272 to the code that implements the interface methods of interface IFCB. Offsets into the vtable 260 are calculated during the resolution step 118 so that the methods accessible from each instance of a class represented by the object instance 254 ('BiggerO', for example) of class 'bar' can quickly access the methods of class bar.

The above described process all takes place before the interpretation step 130, where the compiled bytecodes are interpreted. When the software virtual machine 100 reaches a statement requiring it to access an object method, both the prior art technique for object access shown in FIG. 3 and the technique embodying the present invention of FIGS. 4A–4C must locate the code for the method. This is accomplished by means of the pointers stored in the vtable 260.

When the software virtual machine 100 first encounters a method call (with or without parameters) it must access the class structure to determine, for example, that the method encountered is the first method, 'Method 1' inherited from the class 'foo' by the class 'bar' to find that a pointer to this method is at an offset of 4 bytes from the class pointer 'class*' of the vtable 260.

When the software virtual machine first encounters a method call, the pointer 280 for 'Method1' points to a stub program which determines what to do with the code that implements 'Method1'. If Method1 is a short program that can rapidly be accessed from the constant pool of the class file, then the stub program remains the means of accessing the code for the method. If however, the stub program determines that the method is more efficiently replaced by JIT compiled code, the stub program is replaced by a replacement JIT program so that subsequent accesses to 'Method1' execute the JIT code and not the interpreted bytecodes in the constant pool. Whether the code is accessed by means of a stub program or through means of JIT code, the pointer 280 stored in the vtable 260 remains the manner of accessing the method code. A presently preferred embodiment of the invention begins interpreting bytecode compiled Java language methods and selectively chooses which code to convert to JIT code. Future implementations could convert all bytecode methods to JIT code before execution of the program.

Listed below are assembler code listings of the JIT code that the virtual machine generates for quickly accessing methods and data fields of objects that the virtual machine encounters as it processes the bytecodes of the class files. The designation 'eax' indicates a thirty-two bit register of a computer CPU.

A) Calling a method at offset 4 in the vtable 260:
The content of the register ecx is a reference to an object such as the object 250 of class type bar. This call would access the pointer to method1 in the

```
mov     eax,[ecx]     ; move contents of ecx into register eax
call    [eax + 4]     ; add offset to base of vtable and jump
                      ; to the code
                      pointed to by
                      the pointer
```

The first time the VM encounters this method in the compiled bytecodes, JIT code is generated so that each subsequent time the method for a particular object is executed it requires only two assembler code statements to access the method. It is appreciated that as the VM interprets other bytecodes that these two statements for accessing a method could be part of looping or branching constructs that the V. generates to speed execution of the interpreted code. Use of an interpreter is not required and the above example of an access to a method could also be part of compiled code that is based on a compiled version of the class file.

B) Accessing a field at offset object +8:

Object 'Bigger O' contains a field of data 'Field #2' in the object instance 254. The first time the VM. encounters this data in the class file, it generates the JIT code for accessing the data so that each subsequent time the data is accessed it is accomplished without reference to the data pool and in one machine instruction. If register ecx is the object reference then the data is moved into register eax with a single statement of the form:

```
mov     eax,[ecx + 8]    ;register eax now contains the field offset in
                         ;the instance 254 two slots above the base
```

C) Accessing an array member:

The index to the array is in register esi. In the following example an element in an array of bytes is accessed. The address of the base of the array is contained in register 'eax'. The contents of base +8 is the length of the array. The index of the 'value' or 'member' within the array is contained in register 'esi'. 'esi'.

```
cmp     esi,[eax + 8]         ;compare length of array to index
jae     OutOfBounds           ;error if index greater than length
mov     eax,[esi*4 + eax + 8] ;get contents and move to register eax
```

D) Calling an interface method at offset 4 bytes into interface IFCB:

The relative position of the interface methods are stored in the class structure pointed to by the pointer 263. As the software virtual machine encounters a method in the second interface IFCB, method 4, the following JIT code accesses this method.

```
        mov     eax,[Guess]
        mov     edx,[InterfaceID]
        call    GetInterfaceOffset
        call    [eax + 4]
```

The JIT code guesses that the last interface accessed by an object of class bar is being accessed again. The JIT code loads the base address of the last interface into register eax. The JIT code then loads the interface Id of the interface presently being accessed into register edx and calls a subroutine called 'GetInterfaceOffset', to see if the guess was correct. The subroutine 'GetInterfaceOffset' compares the interface Id in register edx with a variable maintained by the JIT code containing the interface id last accessed. If the two are the same, the subroutine 'GetInterfaceOffset', returns and the call to the routine is made. If the two are not the same, the JIT looks up the address of the interface and returns with that address in register 'eax'. The JIT code then branches to the method pointed to by the location at the address 'eax+4'.

A virtual machine constructed in accordance with the invention can be implemented in a number of ways. Although a presently preferred embodiment for practicing the present invention has been described with a degree of particularity, it is the intent that the invention include all modifications and alterations from the disclosed design falling within the spirit or scope of the appended claims.

We claim:

1. A method for accessing components of object instances for use with an object oriented software virtual machine comprising the steps of:

a) allocating a first block of memory based on a class definition for one or more methods implemented in a class hierarchy; said class hierarchy including a base class and any additional classes derived from the base class; and b) instantiating instances of classes within said class hierarchy by performing the substeps of:

i) allocating a second block of memory for each such instance in the class hierarchy;

ii) initializing a method table pointer within the second block of memory to point to a specific memory location of the first block of memory for each such instance in the class hierarchy, said method table pointer initialized to point to a location within the first block of memory for accessing the one or more methods of said class hierarchy;

iii) initializing other data unique to each object instance at memory offsets relative to the method table pointer within the second block of memory for the object instances within the class hierarchy; and iv) initializing a synchronization block for the object instance at an offset relative to the method table pointer.

2. The method of claim 1 wherein the software virtual machine is an interpreter for compiled Java language bytecodes and the first block stores interface methods implemented within the class hierarchy and also stores interface fields that are implemented within the class hierarchy.

3. The method of claim 1 wherein the methods include methods that are declared in Java interfaces and wherein said first memory block includes methods of each interface implemented in the base class or implemented in any additional class within the class hierarchy.

4. The method of claim 1 wherein the first block of memory includes memory locations for storing pointers to other memory blocks containing machine readable code that implements the one or more methods.

5. In a stored program computer system including memory for storing data and code, a process for interpreting Java language bytecodes based on a class structure made up of multiple classes and accessing object components comprising object data and methods of the objects within the class structure, said process comprising the steps of:

a) allocating memory for a method procedure table in a computer memory to hold method procedure data for the methods of each class within the class structure; each method procedure table having an identified base location in the computer memory;

b) defining the function for each of the plurality of methods by placing machine readable method procedure data at memory locations relative to the identified base location of said method procedure table;

c) identifying an object instance area in the computer memory for object instances of the class structure and initializing a specific location of the object instance area to hold a pointer to the base location for the method procedure area of the class for that object instance; and d) initializing data unique to said object instance at offsets from the specific location.

6. The method of claim 5 wherein the method procedure table data comprises pointers to compiled machine readable portions of code data that are derived from the Java language bytecodes of the methods.

7. The method of claim 6 wherein the compiled machine readable portions of code data are just in time (JIT) compiled code data based on the bytecode implementation of the methods of the class structure.

8. The method of claim 7 wherein the compiled machine readable portions of code data are generated when a method is encountered during interpretation of compiled Java language bytecodes from a class file.

9. The method of claim 8 wherein memory for the method procedure table is allocade when the class file associate with the procedure table is loaded.

10. Computer apparatus for interpreting compiled bytecodes of a computer program and accessing object instances of a class structure comprising:

a) a computer memory for storing a virtual machine computer program and data; and b) a processor for executing a program stored in the memory that:
   i) allocates a first block of memory based on the class definition for all dynamic methods implemented by a class hierarchy that includes a base class and any additional classes derived from the base class; and
   ii) instantiates instances of classes within the class hierarchy derived from the base class in other memory blocks by initializing a method table pointer at a base location in said other memory block for each such instance in the class hierarchy, said method table pointer initialized to point to the first block of memory defining the dynamic methods for the class hierarchy;
   iii) initializes other data unique to each instance at offsets relative to the method table pointer within the other memory block for said class instance to speed the accessing of dynamic methods of the class hierarchy; and c) a communications interface for receipt of compiled bytecodes transmitted through the communications interface and wherein the virtual machine computer program stored in memory interprets the bytecodes.

11. A stored memory program for execution on a computer comprising a sequence of instructions for implementing a Java language virtual machine that interprets a compiled Java language program, said stored memory program comprising:

a) a first code portion for allocating a first block of memory based on a class definition for methods implemented by a class hierarchy that includes a base class and any additional classes derived from the base class; and b) a second code portion for instantiating instances of classes within said class hierarchy by:
   allocating a second block of memory for each such instance in the class hierarchy;
   ii) initializing a method table pointer at a specific location within the second block of memory for each such instance in the class hierarchy, said method table pointer initialized to point to the first block of memory containing definitions for the methods of said class hierarchy including pointers to code that is compiled based upon JAVA language data from a class file; and
   iii) initializing other data unique to each object instance at memory offsets relative to the method table pointer within the second block of memory for object instances within the class hierarchy; and c) additional code portions for accessing object components by obtaining a reference to an object instance which points to the specific location within the second block of memory for that object instance and determining data and method locations by means of offsets from the specific location and accessing the method table pointer to access class methods of said object.

12. A method for accessing components of object instances by an object oriented software virtual machine comprising an interpreter for compiled Java language bytecodes, said method comprising the steps of:

a) allocating a first block of memory based on a class definition for one or more methods implemented in a class hierarchy including interface methods implemented with the class hierarchy; said class hierarchy including a base class and any additional classes derived from the base class; and b) instantiating instances of classes within said class hierarchy by performing the substeps of:
   i) allocating a second block of memory for each such instance in the class hierarchy;
   ii) initializing a method table pointer within the second block of memory to point to a specific memory location in the first block of memory for each such instance in the class hierarchy, said method table pointer initialized to point to a location within the first block of memory for accessing the one or more methods of said class hierarchy; and
   iii) initializing other data unique to each object instance at memory offsets relative to the method table pointer within the second block of memory for the object instances within the class hierarchy.

13. The method of claim 12 wherein the methods include methods that are declared in Java interfaces and wherein said first memory block includes methods of each interface implemented in the base class or implemented in any additional class within the class hierarchy.

14. The method of claim 12 wherein the first block of memory includes memory locations for storing pointers to other memory blocks containing machine readable code that implements the one or more methods.

15. A method for accessing components of object instances by an object oriented software virtual machine comprising the steps of:

a) allocating a first block of memory based on a class definition for one or more methods implemented in a class hierarchy including memory locations for storing pointers to other memory blocks containing machine readable code that implements the one or more methods; said class hierarchy including a base class and any additional classes derived from the base class; and b) instantiating instances of classes within said class hierarchy by performing the substeps of:
   i) allocating a second block of memory for each such instance in the class hierarchy;

ii) initializing a method table pointer within the second block of memory to point to a specific memory location in the first block of memory for each such instance in the class hierarchy, said method table pointer initialized to point to a location within the first block of memory for accessing the one or more methods of said class hierarchy; and iii) initializing other data unique to each object instance at memory offsets relative to the method table pointer within the second block of memory for the object instances within the class hierarchy.

16. The method of claim 15 wherein the software virtual machine is an interpreter for compiled Java language bytecodes and the first block stores interface methods implemented within the class hierarchy and also stores interface fields that are implemented within the class hierarchy.

17. The method of claim 15 wherein the methods include methods that are declared in Java interfaces and wherein said first memory block includes methods of each interface implemented in the base class or implemented in any additional class within the class hierarchy.

18. In a stored program computer system including memory for storing data and code, a process for interpreting a binary representation of a class structure made up of multiple classes and accessing object components comprising object data and methods of the objects within the class structure, said process comprising the steps of:

a) allocating memory for a method procedure table in a computer memory to hold method procedure data for the methods of each class within the class structure, said method procedure table data comprising pointers to compiled machine readable portions of code data that are derived from the binary representation of the methods; each method procedure table having an identified base location in the computer memory;

b) defining the function for each of the plurality of methods by placing machine readable method procedure data at memory locations relative to the identified base location of said method procedure table;

c) identifying an object instance area in the computer memory for object instances of the class structure and initializing a specific location of the object instance area to hold a pointer to the base location for the method procedure area of the class for that object instance; and d) initializing data unique to said object instance at offsets from the specific location.

\* \* \* \* \*